March 31, 1942.

G. McCORMICK 2,278,404

JOURNAL BOX AND LUBRICATOR

Original Filed July 9, 1938

Inventor:
George McCormick
By Rasmussen and Brugman
Attys.

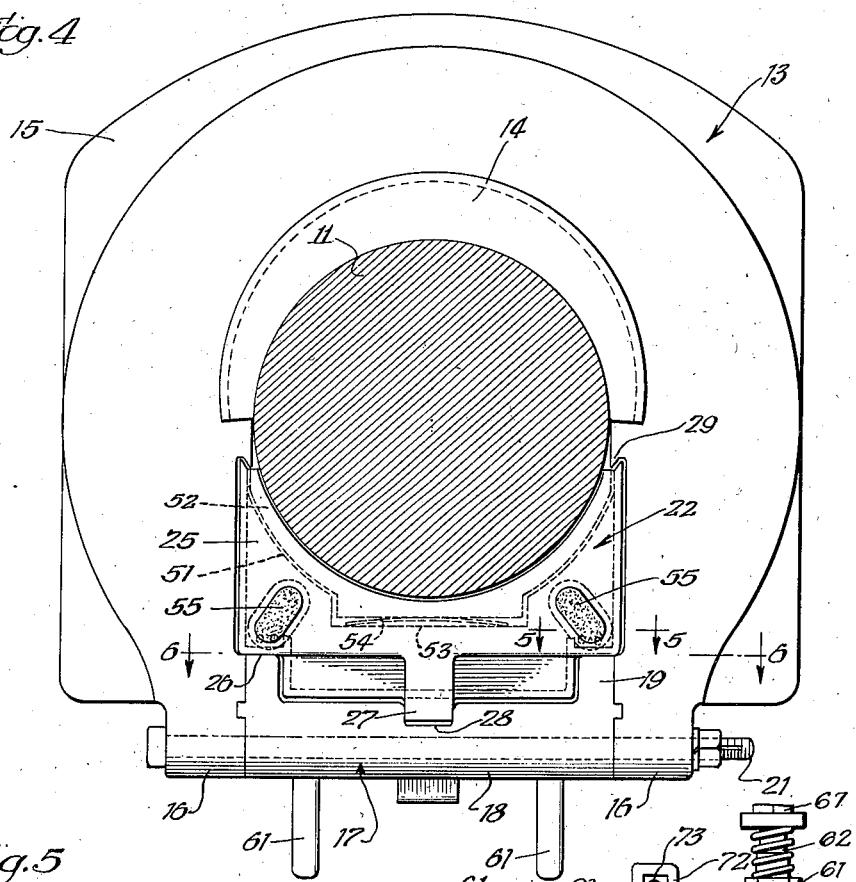
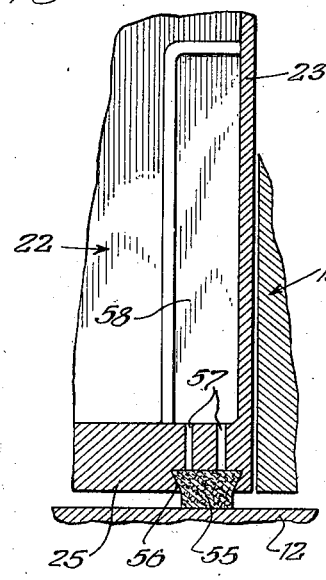
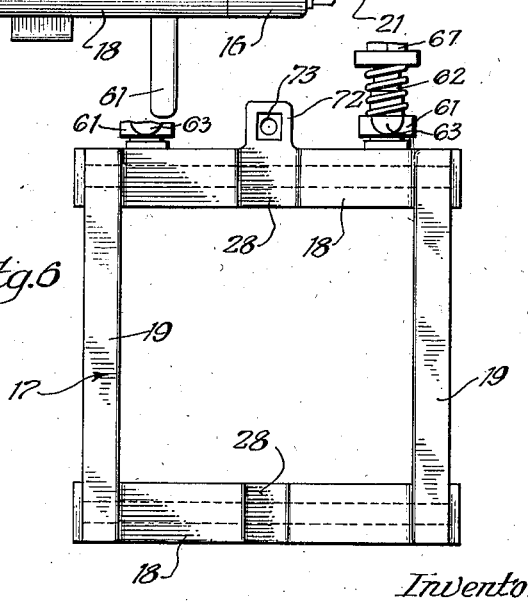

March 31, 1942.    G. McCORMICK    2,278,404
JOURNAL BOX AND LUBRICATOR
Original Filed July 9, 1938    3 Sheets-Sheet 3
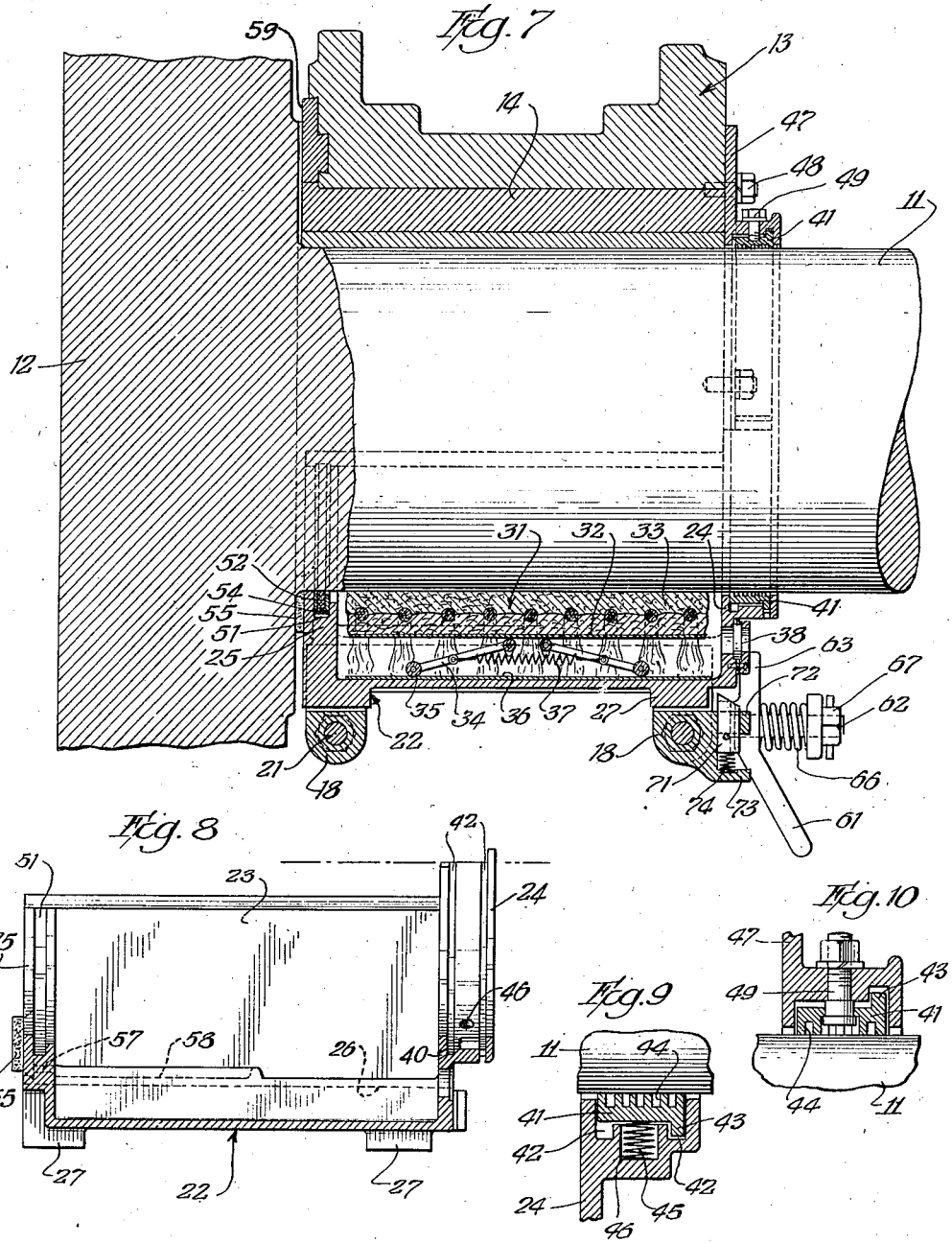
Inventor:
George McCormick
BY
Rasmussen and Brugman
Attys.

Patented Mar. 31, 1942

2,278,404

UNITED STATES PATENT OFFICE 2,278,404

JOURNAL BOX AND LUBRICATOR

George McCormick, Redwood City, Calif.

Substituted for abandoned application No. 218,359, July 9, 1938. This application December 12, 1940, Serial No. 369,726

7 Claims. (Cl. 308—83)

This invention relates in general to journal boxes, and more particularly to novel improvements in a journal box and lubricator construction especially adapted for mounting either inside or outside a wheel on a journal, as is commonly done with the journals of locomotives. The present application is a substitute for my abandoned application Serial No. 218,359, filed July 9, 1938.

A principal object of the invention is the provision of a journal box whose bottom portion is formed as a readily removable oil container or cellar adapted to house lubricating means for automatically raising the oil to the surface of the journal and for supplying limited amounts of oil to the face of the wheel hub adjacent the end of the box.

Another important object of the invention is to provide a resilient mounting for the cellar in such a journal box to enable the cellar to absorb excessive lateral shocks from the wheel by permitting limited resilient movement of the cellar relative to the box longitudinally of the journal, while insuring proper lubrication of the hub face of the wheel.

A further important object of the invention is the provision of manually operable means for securely locking the cellar in the journal box, while permitting its ready removal from the box for inspection, cleaning, or replacement of its lubricator, without necessitating any dismantling of the box.

Another object of the invention is the provision of automatically operable latching means, in conjunction with such locking means, for insuring against accidental displacement of the cellar from the journal box in case of failure to move the manually operable locking means to locking position after insertion of the cellar into the box.

A further object of the invention is to provide means for indicating the level of oil within the cellar and means for conveniently filling the cellar, without necessitating the removal thereof from the journal box.

Another object of the invention is the provision in a journal box having a removable cellar of novel means for excluding dust and other foreign matter from the interior of the cellar and for preventing the loss of oil therefrom.

Numerous other objects and advantages of the invention will be apparent as it is better understood from the following description, which, when taken in connection with the accompanying drawings, discloses a preferred embodiment thereof.

In the drawings:

Fig. 4 is an elevational view of the end of the unit opposite that of Fig. 1, with the journal being shown in section;

Fig. 5 is a detail horizontal section of one of the hub lubricators taken substantially on the line 5—5 of Fig. 4;

Fig. 6 is a top plan view of the spacer or binder, as seen from the line 6—6 of Fig. 4;

Fig. 7 is a longitudinal, vertical section of the device of Figs 1 and 4;

Fig. 8 is a vertical section taken longitudinally through the cellar; and

Figs. 9 and 10 are detail vertical sections taken through the lower and upper halves of the dust guard, respectively, which is provided at the inner or right-hand end of the unit of Fig. 7.

Figure 1:
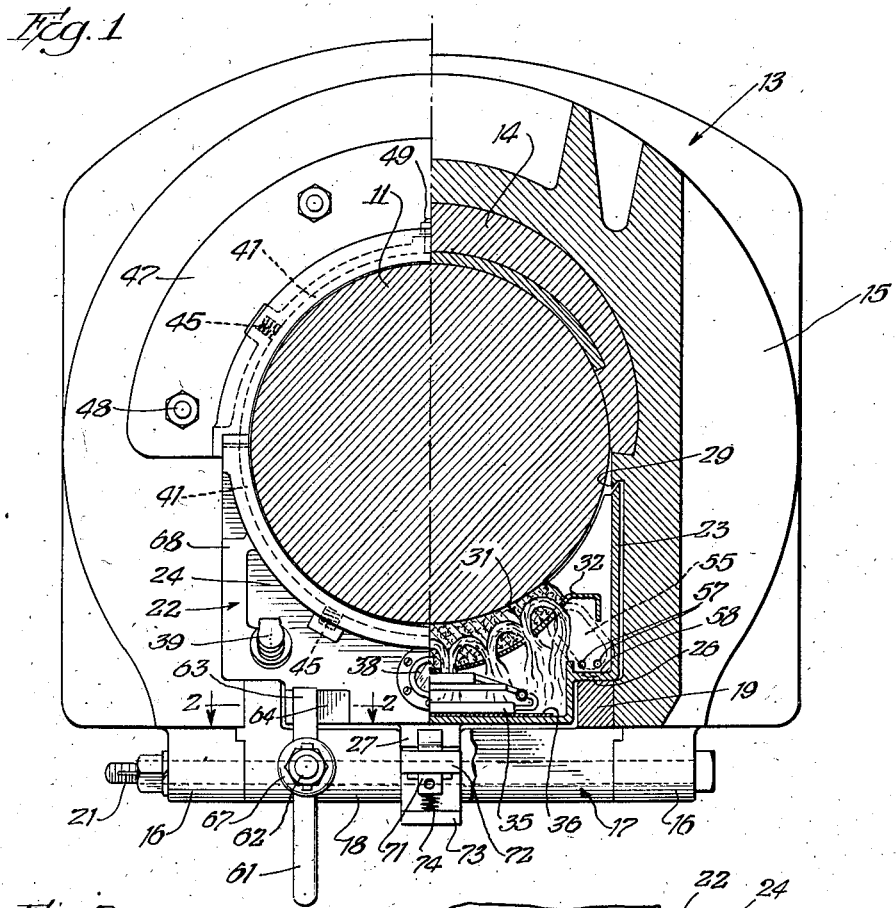
Figure 1 is an end view of a journal box and lubricator embodying the features of the invention as seen from the inside, i. e., looking toward the wheel, the left half of the figure being in elevation and the right half in section.

Referring more particularly to the drawings, reference numeral 11 indicates a journal having a wheel at its outer end, the hub portion of which is designated by reference numeral 12. A journal box 13 of usual construction is adapted to receive the journal 11, being closed at the top and open at the bottom and having any desired type of brass 14 mounted in well-known manner in the upper portion thereof. The sides of the journal box 13 are provided with vertical reinforcing flanges 15, forming the usual yoke, which terminate at their lower ends in apertured lugs 16.

A removable spacer or binder, indicated generally by reference numeral 17 and shown in detail in Fig. 6, extends across the bottom of the journal box 13 between the lugs 16. The spacer 17 is in the form of an open rectangular frame having transverse front and rear members 18 and longitudinally disposed side members 19 formed integrally with each other. The longitudinal members 19 are disposed above the transverse members 18, and the latter are provided with suitable apertures extending therethrough to receive spacer bolts 21 (Figs. 1, 4 and 7). The bolts 21 also extend through the associated apertured lugs 16 to tie the sides of the journal box 13 together beneath the journal 11 and rigidly secure the spacer 17 in position.

The spacer 17 acts as a guide and support for a removable oil container or cellar, indicated generally by reference numeral 22 and shown alone in Fig. 8, which is slidably positioned beneath the journal 11 in the lower part of the journal box 13. The cellar 22 is in the form of a rectangular metal receptacle, which is preferably cast from a suitable light-weight aluminum alloy, having side walls 23 extending up nearly to the center of the journal 11, and front and rear, or inner and outer, end walls 24 and 25, respectively, which are curved to fit closely beneath the journal. The side walls 23 are offset adjacent the lower ends thereof to provide shoulders 26 (Fig. 1) which rest upon the upper surfaces of the longitudinally extending portions 19 of the spacer 17. The cellar 22 is thus supported on the spacer 17. The bottom of the cellar is provided at each end with guide lugs 27 having a sliding fit with corresponding recesses 28 disposed in the central portions of the upper surfaces of the transverse members 18 of the spacer 17. The cellar 22 is thus properly positioned in the journal box 13 on the spacer 17, and may be slid out of the box horizontally toward the inside, i. e., away from the wheel, and to the right in Fig. 7. The upper edges of the side walls 23 of the cellar are beveled inwardly, as shown best in Fig. 1, so as to fit beneath and outwardly of longitudinal, beveled flanges 29 provided on the inner sides of the journal box 13. Oil that is thrown or wiped from the surface of the journal 11 will thus be prevented from escaping between the side walls of the journal box and cellar, and will be forced to drain back into the cellar.

The cellar 22 is adapted to contain oil or other suitable liquid lubricant, and is provided interiorly thereof with suitable removable means for raising the oil from the bottom of the cellar to the under surface of the journal 11. As an example of such means, a lubricator 31 of the type shown and described in my prior United States Patent No. 2,143,954, issued January 17, 1939, is illustrated in operative position within the cellar in Figs. 1 and 7. The lubricator 31 comprises a curved, perforate plate 32 upon the upper surface of which is disposed a suitable absorbent pad 33 having wicks extending downwardly therefrom, through the plate and into the oil in the bottom portion of the cellar. A pair of toggle-like bails 34, hinged to the under side of the plate 32 and inclined downwardly therefrom, are provided on their lower portions with rollers 35 resting on a metal wear plate 36 which is removably disposed on the bottom of the cellar 22. Springs 37 are connected at their opposite ends to the bails 34 to urge the lower ends of the latter toward each other, thereby pressing the plate 32 upwardly to resiliently maintain the oil-saturated pad 33 in engagement with the under surface of the journal 11. The lubricator 31 normally remains in the cellar 22, and may be removed from the journal box 13 with the cellar. The front or inside end wall 24 of the cellar is provided with a gauge or sight glass 38 (Figs. 1 and 7) to permit ready inspection of the oil level within the cellar, and with a suitable filler cup or plug 39 (Fig. 1) through which oil may be introduced without removing the cellar from the journal box 13.

The upper edges of the front and rear walls 24, 25 of the cellar 22 are necessarily not in direct contact with the outer surface of the journal 11. Consequently, means are provided for preventing any dust or other foreign material from finding its way between the journal and the cellar and into the latter, and for preventing the escape of oil from the cellar. The upper portion of the inner end wall 24 of the cellar 22 extends outwardly therefrom and is channeled in the manner illustrated in Figs. 7, 8 and 9 to receive the lower half of a dust guard 41. Circumferential grooves 42 are provided in the bottom surface of this channeled portion of the wall 24, the outer one of which is adapted to receive a flange 43 (Fig. 9) on the outer surface of the dust guard 41. The inner surface of the dust guard 41 is provided with a plurality of serrations or grooves 44, and is adapted to be maintained in engagement with the journal 11 by means of a pair of springs 45 disposed in suitable apertures 46 provided in the upper channeled portion of the end wall 24.

The upper and lower portions of the dust guard 41 are separate from each other, and together form a ring completely encircling the journal 11, as will be seen from Figs. 1 and 7. The upper half of the dust guard 41 is mounted in a flanged retainer 47 in similar manner to the mounting of the lower half in the wall 24 of the cellar 22. The dust guard retainer 47 is semi-circular in shape and is secured to the inner end wall of the journal box 13 by suitable studs 48 (Figs. 1 and 7). Springs 45, arranged in similar manner to those previously described, are provided for the purpose of resiliently maintaining the upper portion of the dust guard 41 in engagement with the journal 11. In order to maintain the upper portion of the dust guard 41 in the retainer 47 when the latter is removed from the journal box 13, however, a bolt 49 is provided which extends upwardly through suitable apertures in the upper portion of the dust guard 41 and the retainer 47, as illustrated in detail in Fig. 10.

It is preferred that both the upper and lower portions of the dust guard 41, which together form a complete ring, be made of brass, although any other suitable material may be employed which will not score the journal 11. Oil attempting to escape along the surface of the journal will be collected in the grooves 44 of the dust guard 41, and a suitable aperture 40 is provided in the channeled portion of the end wall 24 of the cellar, as shown in Fig. 8, connecting the inner groove 42 to the interior of the cellar to drain away any excess oil that may be thus collected by the dust guard. The close fit of the ring 41 with the journal, as maintained by the springs 45, will effectively prevent any dust or other foreign matter from entering the journal box or cellar from the inner end thereof.

Means are also provided for preventing dust or any other foreign matter from entering the cellar 22 from its outer end. The upper portion of the outer or rear wall 25 of the cellar is formed with a groove 51 (Figs. 7 and 8) within which is seated a semi-circular dust guard 52. The central or lowest portions of the groove 51 and the dust guard 52 are flattened, as shown at 53 in Fig. 4, and a leaf spring 54 is inserted in the groove beneath the guard at this point to press the latter upwardly against the journal. The guard itself is preferably formed as a metal channel in which is seated a flexible, oil-proof strip, as shown in Fig. 7.

Means are provided for supplying limited amounts of oil from the celler 22 for lubrication of the inner face of the hub 12 of the wheel, This means comprises a pair of oil saturated pads 55 of felt, or any other suitable material (Figs. 4, 5, 7 and 8). The rear wall 25 of the cellar is formed with under-cut recesses 56 (Fig. 5) for receiving and retaining the pads 55. A pair of holes 57 are drilled through the rear wall 25 for communication between each of the recesses 56 and a shallow trough 58 formed inside the cellar on the offset portions 26 of its side walls 23. The troughs 58 are kept full and supplied with oil by splashing from the main body of oil in the bottom of the cellar and by drainage from the flanges 29 on the inner side walls of the journal box, as will be apparent from Fig. 1. The holes 57 permit a limited amount of the oil in the associated trough 58 to be supplied to the related pad 55, thereby insuring proper lubrication of the inner face of the hub 12 of the wheel and the outer bearing face 59 of the journal box.

Figures 2, 3:
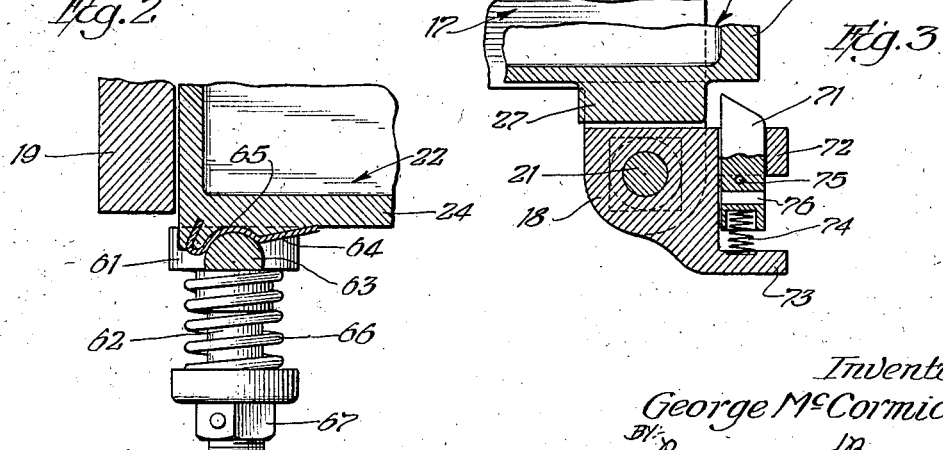
Fig. 2 is a detail horizontal section taken substantially on the line 2—2 of Fig. 1.
Fig. 3 is a detail vertical section showing the cellar safety latch.

The entire cellar 22 is movable longitudinally on the side portions 19 of the spacer 17, and is yieldably held in its rearmost or outermost position of Fig. 7 to maintain the pads 55 in contact with the inner face of the hub 12. The means for so holding the cellar in such position also locks the cellar against removal from the journal box 13, while at the same time enabling the cellar to absorb excessive lateral shocks from the wheel by permitting limited resilient movement of the cellar relative to the spacer and journal box longitudinally of the journal. For this purpose, there are provided two swinging latches 61 (Figs. 1, 2 and 7) which are pivotally mounted on studs 62 projecting forwardly from the front or inward horizontal portion 18 of the spacer 17. The studs 62 may be formed integrally with the spacer 17, but it is preferred that the rearwardly disposed head portions thereof be welded to the front surface of the transverse member 18 of the spacer. The lower portions of the latches 61 form handles, and their upper portions 63 have their rear surfaces rounded, as shown in Fig. 2, to engage wear plates 64 with a camming action. Each wear plate 64 is provided intermediate its ends with a downwardly recessed or curved portion 65. The inner end of each wear plate is angularly disposed relative to the front surface of the wall 24 of the cellar 22, and slopes rearwardly from the central curved portion 65 toward the front surface of the wall 24. The outer end of each wear plate 64 is bent back upon itself, as illustrated in Fig. 2, to function as a retaining means for the wear plate, the latter being cast integrally with the cellar 22. These plates 64 are preferably made of spring steel, being inserted in proper position in the mold for the cellar prior to the casting of the latter. A coil spring 66 surrounds each stud 62, and is held against the forward portion of its latch 61 and retained in position by a nut 67 mounted upon and rigidly secured to the outer end portion of the stud 62.

If the upper ends 63 of each of the latches 61 are swung inwardly and downwardly from their position of Fig. 1, the cellar 22 will be free to be slid inwardly, or to the right in Fig. 7, and removed from the journal box 13. When in their position of the drawings, the upper ends 63 of the latches 61 will engage the recessed portions 65 of the wear plates 64 and be held therein by the springs 66 to resiliently maintain the cellar 22 in the journal box at the limit of its rearward movement, which is defined by flanges 68 projecting laterally from the front wall 24 of the cellar (Fig. 1) and contacting the front face of the journal box 13. Limited forward or inward movement of the cellar 22 relative to the spacer 17 and journal box 13 from this rearward position, however, will be permitted by the springs 66, to absorb excessive lateral shocks from the wheel. This arrangement will prevent undue wear of the hub lubricating pads 55, as well as damage to the cellar, to insure proper lubrication of the inner surface of the hub 12 of the wheel.

As has been noted, swinging of the latches 61 until their upper ends 63 disengage the wear plates 64 on the front wall of the cellar will enable the cellar 22 to be pulled out of the journal box 13 for inspection, cleaning, or replacement of its lubricator 31, without necessitating dismantling of the journal box by removal of the spacer bolts 21. It has been found in practice, however, that this arrangement may result in loss of the cellar 22 and lubricator 31 from the journal box, through the carelessness of an operator in failing to swing the latches 61 into their locking position after insertion of the cellar into the journal box. Means are provided for automatically preventing accidental displacement of the cellar 22 from the journal box after it has been slid into its position of the drawings. This means comprises a latch 71 (Figs. 1, 3 and 7) which is mounted for vertical movement centrally of the front or inner transverse member 18 of the spacer 17. To this end, the front transverse member 18 is provided with an apertured lug 72 and a ledge or shelf 73 formed integrally therewith and extending forwardly therefrom in spaced relationship to each other. The latch 71 is mounted for sliding vertical movement in the recess provided in the lug 72, and is resiliently maintained in its uppermost position by a spring 74 interposed between the lower end of the latch and the ledge 73. Upward movement of the latch 71 by the spring 74 is limited by a pin 75 (Fig. 3) extending through the latch and contacting the under surface of the lug 72. A suitable aperture 76 is provided in the lower portion of the latch 71 (Fig. 3) to enable the latch to be depressed against the spring 74. In its normal position of the drawings, the upper end of the latch 71 is in the path of movement of the forward surface of the inner guide lug 27 provided on the bottom of the cellar. While a certain amount of relative movement between the cellar 22 and the spacer 17 will thus be permitted, the latch 71 will prevent withdrawal of the cellar from the journal box, unless manually depressed against the action of the spring 74. The upper end of the latch 71 is chamfered or slopes downwardly and outwardly, so that the latch will be automatically depressed by the lugs 27 when the cellar is being slid rearwardly into the journal box.

From this description of the embodiment of the invention illustrated herein, it will be seen that the several objects previously recited have been fully accomplished and incorporated in a practical and simplified construction. The manner of locking the cellar in the journal box not only permits the desired resilient movement of the cellar relative to the box longitudinally of the journal, but enables the complete removal of the cellar from the box without necessitating any dismantling of the latter. At the same time, proper lubrication of the inner surface of the wheel hub is accomplished, regardless of the operating conditions encountered. Servicing of the journal box is greatly simplified, and the usual loss of oil from the cellar and the entry therein of dirt and other foreign material is effectively prevented. Another distinct advantage of the present construction lies in the provision of the automatically operable cellar safety latch, since the possibility of loss of the cellar and its lubricator from the journal box through carelessness, which is inherent in any construction employing a simple manually operable cellar locking means, is completely eliminated.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A journal structure, comprising a box partially surrounding the journal adjacent a wheel hub, a bearing at one end of the box for the face of the wheel hub, an oil cellar mounted in the box beneath the journal, a trough disposed interiorly of said cellar along a side wall and above the bottom thereof to receive oil from the latter by splashing, and means for supplying a limited amount of oil from said trough to said wheel hub face and said end bearing.

2. A journal structure, comprising a box partially surrounding the journal adjacent a wheel hub and having horizontal, under-cut flanges extending along the inner side walls thereof, a bearing at one end of the box for the face of the wheel hub, an oil cellar slidably mounted in said box beneath the journal and having side walls fitted beneath and exteriorly of said undercut flanges, means disposed interiorly of said cellar for automatically supplying oil from the bottom thereof to the under side of the journal, troughs disposed interiorly of said cellar along the side walls thereof to receive excess oil supplied to the journal by drainage from said undercut flanges, and means for supplying oil from said troughs to said wheel hub face and said end bearing.

3. A journal structure for locomotive axles comprising a box having an open bottom, a removable spacer bridging said open bottom, said spacer having elevated longitudinal members adjacent the sides of the box, a bearing in the upper portion of the box resting upon the axle, a bearing at one end of the box for the face of the wheel hub, a lubricant container mounted for longitudinal sliding movement in the box beneath the axle, said container having a bottom, end walls and side walls, said side walls having inverted shoulders above said bottom resting upon the elevated members of said spacer, said shoulders forming interior troughs within the container, the end wall of said container adjacent the face of the wheel hub having exterior recesses aligned with said troughs and said end wall having lubricant conducting apertures connecting said troughs with said recesses, absorbent pads mounted in said recesses and positioned for contact with the face of the hub, said pads conducting lubricant from said troughs to said face, means within the container for conducting lubricant upwardly to the axle journal, and resilient locking means for removably holding the container in position within the box.

4. A journal structure for locomotive journals comprising a box partially surrounding the journal adjacent the wheel, a bearing in the upper portion of the box resting upon the journal, a bearing at one end of the box for the face of the wheel hub, a slidable oil cellar in the box beneath the journal, means in said cellar for conveying oil upwardly to said journal, means carried by one end of the cellar for receiving oil therefrom and conveying it to the face of the hub, and manually operable means for resiliently locking said cellar in said box and maintaining resilient contact between said hub lubricating means and said hub face.

5. A journal structure for locomotive journals comprising a box partially surrounding the journal adjacent the wheel, a bearing in the upper portion of the box resting upon the journal, a bearing at one end of the box for the face of the wheel hub, a slidably removable oil cellar in the box beneath the journal, means in said cellar for conveying oil upwardly to said journal, means for maintaining said journal lubricating means in contact with said journal, means carried by one end of the cellar for receiving oil therefrom and conveying it to the face of the hub, and manually operable means for resiliently locking said cellar in said box and maintaining resilient contact between said hub lubricating means and said hub face.

6. A journal structure for locomotive journals comprising a box partially surrounding the journal adjacent the wheel hub, a bearing in the upper portion of the box resting upon the journal, a bearing at one end of the box for the face of the wheel hub, a slidably removable oil cellar in the box beneath the journal, resilient means in said cellar for conveying oil upwardly to said journal, said resilient means including means for maintaining contact with said journal, an absorbent pad positioned at one end of the cellar to receive oil therefrom and means for establishing and maintaining resilient contact between said pad and the face of the hub comprising a manually operable means for resiliently locking said cellar in said box.

7. A journal structure for locomotive journals comprising a box partially surrounding the journal adjacent the wheel hub, a bearing in the upper portion of the box resting upon the journal, a bearing at one end of the box for the face of the wheel hub, an oil cellar mounted in the box for longitudinal sliding movement beneath said journal, means in said cellar for conveying oil upwardly to said journal, absorbent means resiliently contacting said hub face in one end of said cellar for conveying oil to the face of the hub, and manually operable means for resiliently locking said cellar in said box and maintaining contact between said absorbent means and said hub face.

GEORGE McCORMICK.